United States Patent
Clegern (10) Patent No.: US 11,015,678 B2
(45) Date of Patent: May 25, 2021

(54) FLYWHEEL ENERGY STORAGE DEVICE

(71) Applicant: KineticCore Solutions LLC, Loveland, CO (US)

(72) Inventor: James B. Clegern, Loveland, CO (US)

(73) Assignee: KineticCore Solutions LLC, Loveland, CO (US)

( * ) Notice: Subject to any disclaimer, the term of this patent is extended or adjusted under 35 U.S.C. 154(b) by 0 days.

(21) Appl. No.: 15/929,939

(22) Filed: May 29, 2020

(65) Prior Publication Data

US 2020/0386295 A1    Dec. 10, 2020

Related U.S. Application Data (60) Provisional application No. 62/857,088, filed on Jun. 4, 2019.

(51) Int. Cl.
  *F16F 15/315* (2006.01)
  *F16F 15/31* (2006.01)
  *F16F 15/305* (2006.01)

(52) U.S. Cl.
  CPC ......... *F16F 15/315* (2013.01); *F16F 15/305* (2013.01); *F16F 15/31* (2013.01)

(58) Field of Classification Search
  CPC .......... F16F 15/315; F16F 15/31; F16F 15/30; F16F 15/3153; F16F 15/3156; F16F 15/305
  See application file for complete search history.

(56) References Cited

U.S. PATENT DOCUMENTS

| | | | |
|---|---|---|---|
| 3,496,799 A * | 2/1970 | Call | F16C 15/00 74/572.11 |
| 3,977,273 A | 8/1976 | Ernst et al. | |
| 4,052,913 A | 10/1977 | Schultz et al. | |
| 4,102,221 A | 7/1978 | Hatch | |
| 4,123,949 A * | 11/1978 | Knight, Jr. | F16D 3/58 464/55 |
| 4,176,563 A | 12/1979 | Younger | |
| 4,359,912 A | 11/1982 | Small | |

(Continued)

FOREIGN PATENT DOCUMENTS

| | | |
|---|---|---|
| DE | 2949125 | 6/1981 |
| EP | 0066040 | 12/1982 |

OTHER PUBLICATIONS

International Search Report and Written Opinion, dated Aug. 18, 2020 in PCT/US2020/70096, 9 pages.

(Continued)

*Primary Examiner* — Jeremy R Severson
(74) *Attorney, Agent, or Firm* — Trenner Law Firm, LLC; Mark D. Trenner (57) ABSTRACT

An example flywheel energy storage device includes a continuously curved fiber-resin composite ovoid shell. Hubs are concentrically disposed within and outside the shell at the shaft. A plurality of radially oriented, fiber-resin composite helical wraps of uniform width are used to construct the ovoid shell and couple the shell to the hubs for co-rotation and torque transfer. Integrated internal structures are attached to the external ovoid shell and provide compression support for the external ovoid shell. Upon rotation, the ovoid shell elongates slightly to increase the flywheel effective moment of inertia at operational speeds.

18 Claims, 7 Drawing Sheets

(56) References Cited

U.S. PATENT DOCUMENTS

| | | | |
|---|---|---|---|
| 4,629,644 | A | 12/1986 | Matuska |
| 4,660,435 | A | 4/1987 | Davis et al. |
| 4,765,198 | A | 8/1988 | Stravrindis |
| 6,583,528 | B2 | 6/2003 | Gabrys |
| 6,867,520 | B2 | 3/2005 | Jennings |
| 8,776,635 | B2 | 7/2014 | Morgan et al. |
| 9,267,570 | B2 | 2/2016 | Spears et al. |
| 9,325,217 | B2 | 4/2016 | Veltri |
| 10,221,917 | B2 * | 3/2019 | Maiullo .................. F16F 15/31 |
| 10,281,003 | B2 | 5/2019 | Gennesseaux |
| 2001/0054856 | A1 | 12/2001 | Gabrys |
| 2012/0151791 | A1 | 6/2012 | Atkins |

OTHER PUBLICATIONS

Machine Translation of DE2949125, dated Jul. 15, 2020, 3 pages.
Clegern, James B., "Strategic Technology Maturation and Insertion (STMI): a requirements guided, technology development optimization process," University of Tennessee, Published Dissertation, May 14, 2014, 216 pages.
Beacon Power, en.wikipedia.org/wiki/Beacon_Power, May 9, 2020, 2 pages.
Carver, Cam, Grid Connected Flywheel Energy Storage Facility, Temporal Power, www.altenergymag.com/article/2014/08/grid-connected-flywheel-energy-storage-facility/1467, Aug. 1, 2014, 11 pages.
Energiestro, Using Concrete to Power the World, www.livewire.shell/what-is-shell-livewire/news/energiestro-using-concrete-to-power-the-world.html, May 14, 2019, 5 pages.

* cited by examiner

FLYWHEEL ENERGY STORAGE DEVICE

PRIORITY CLAIM

This application claims the priority filing benefit of U.S. Provisional Patent Application No. 62/857,088 filed Jun. 4, 2019 for "Catenary Flywheel Kinetic Battery" of James B. Clegern, hereby incorporated by reference in its entirety as though fully set forth herein.

BACKGROUND

Flywheels have been well established for over 2000 years as energy storage devices in the form of spinning kinetic energy. In larger form factors (typically 10 Kilowatt hours or higher), they can provide the core of an Energy Storage System (ESS) for use with renewable and traditional electrical grids ranging from multiple-module utility systems to single unit residential/commercial systems. Vacuum enclosed flywheels coupled with ultra-low friction magnetic bearings are particularly well suited for ESS applications that require frequent charge/discharge cycles per day since they essentially have no parts that wear-out. Examples of these high cycle ESS applications include supporting the intermittent nature of renewable energy, powering electric vehicle charging stations, and stabilizing grid frequency regulation. Generally, however, the current generation of flywheels with the potential for use in these applications rotate at relatively lower speeds and are fabricated with large to massive amounts of structural materials such as steel or composite fiber-resin laminates. These high mass flywheels are often cost prohibitive for the energy they are able to store, both in initial cost and installation and limit applications to where volume or mass are not constrained.

When examining the energy storage capacity of a flywheel, they are largely limited by their structural design and selection of structural materials. The structural design dictates how the flywheel attaches to the rotating shaft to transfer torque and where the structural mass is placed to maximize the rotating moment of inertia. The structural material properties (i.e., strength, density, elasticity, fatigue resistance, etc.) dictate the flywheel operational speed and lifecycle endurance based on the structural design. For example, with each evolution of structural materials, from the stone age, bronze age, steel age and now composite age, the improved structural material properties of the flywheel have allowed for faster rotational speeds of a given structural design.

The flywheel kinetic energy storage ($E_k$) capability is governed by the standard equation $E_k = \frac{1}{2} I \omega^2$ where the structural design mass placement in the moment of inertia (I) and the flywheel rotational speed ($\omega$) are the two energy storage drivers. Of the two energy storage drivers, increasing the structural mass and moment of inertia (I) for a given structural material has been the standard path forward for greater energy storage. This involves adding thickness or height to a traditional disk, cylinder-rim, or ring-rim type structural flywheel designs once a maximum speed has been reached for a given structural material. Utilizing composite materials for a traditional mass focused flywheel was demonstrated commercially with a 1,250 kilogram unit storing 25 kilowatt-hours of energy. Utilizing steel materials for a traditional mass focused flywheel was demonstrated commercially with a 2,270 kilogram unit storing 50 kilowatt-hours of energy. Even the utilization of concrete materials for a traditional mass focused flywheel was demonstrated commercially with a 3,000 kilogram unit storing 10 kilowatt-hours of energy.

Increasing the flywheel energy storage by adding mass becomes a challenge on three fronts. First, the flywheel energy storage capacity increases linearly with the increase in flywheel mass, resulting in practical operational limits for manufacturing, delivering and emplacing massive flywheels of high energy storage capacity. Second, as the flywheel mass increases each of the supporting flywheel subsystems (i.e. bearings, support structure, and vacuum enclosure) also must also be "upsized" to handle the added mass, adding to overall system mass and complexity. Third, the overall mass increase and subsystem complexity to attain increased energy storage becomes a significant cost driver, pricing many flywheel energy storage systems well outside a reasonable Return On Investment time frame.

The second energy storage driver is to focus on increasing the flywheel speed since it improves a flywheel energy storage capability by a power of two. Two flywheel development areas allow an increase in speed: structural design and stronger structural materials. Utilizing lighter and stronger composite materials in place of heavier metals and fiberglass has been the mainstay of traditional disk, cylinder-rim, or ring-rim type traditional structural mass flywheel designs. New structural flywheel designs which explored increased energy storage capacity were examined in the 1970's, employing the flexibility of the new manufacturing technique of continuous filament winding of resin-impregnated composite filament material. These new structural designs had promise, but only augmented the traditional ring-rim mass flywheel designs.

DETAILED DESCRIPTION

A high speed, compact flywheel system is disclosed, that is suitable for storing excess energy from renewable and traditional utility power facilities and dispensing energy when energy is required. An example high speed, elliptical ovoid flywheel includes a composite shell formed of helically wound ribbons of resin-impregnated composite filament material combined with internal composite structures providing compressive support. In an example, the filament wound composite shell is coupled to the rotating shaft by paired structural flange plates concentrically disposed on either side of the shaft where the plurality of the composite shell filament ribbons are attached for torque transfer. The majority of the flywheel shell interior is hollow to maximize the flywheel inertial moment mass at the maximum allowable shell radius.

The flywheel ovoid shape and elliptical curvature are formed to support the centripetal forces varying with the radius of each fiber of the helical overwrap. This permits two plane structural support, increasing the allowable tip speed significantly compared with a traditional disk or cylindrical flywheel of equal diameter and same structural materials. The all-composite nature of the elliptical flywheel structure increases operational safety and allows maximum and consistent utilization of the composite material strength in its optimal embodiments.

In an example, the elliptical ovoid flywheel includes a plurality of sets of helical wraps, each set of helical wraps having a uniform width. Each set of helical wraps has a layer extending around the outer surface of the shell and the hub on both sides of the axis of rotation. In another example, each set of helical wraps has a near continuous, single ended filamentary material wound in a unidirectional relationship and encased in a resin matrix. In another example, each set of helical wraps is uniformly stressed over the width of each wrap during rotation. In another example, each set of helical wraps has a radially oriented, layered composite shell. In another example, the helical wraps are disposed in an overlapping relationship with one another on portions of the hub at locations adjacent to the axis of rotation.

In an example, each layer of the radially oriented helical wrap is angled initially about 5 degrees and stepped to about 35 degrees to shift wrap layer mass build-up away from the axis of rotation to increase flywheel moment of inertia.

In an example, the radially oriented helical wrap is configured to transfer tensile tip stress to the thickened structure near the axis of rotation under compressive stress, thereby maximizing the effective strength of the filament wound composite laminate.

The elliptical ovoid flywheel may have integrated internal structures attached to and providing compression support for the external ovoid shell. In an example, the internal structures are formed from metal or a near continuous single ended filamentary material wound in a unidirectional relationship in a plurality of layers and encased in a resin matrix. In another example, the internal structures are formed from metal, composite laminate wound in a unidirectional relationship in a plurality of layers and that are bonded to the inner layer of the external ovoid shell. The internal structures may have a minimum inner-to-outer ratio of about 0.1 when compared with the outer diameter of the ovoid shell.

In an example, the inner and outermost peripheral surface of the ovoid shell is in the configuration of a rotational ellipse. In an example, the ovoid shell helical wrap layers are secondarily used to control the inertial mass of the flywheel.

In an example, adding or subtracting layers configures the flywheel energy storage capacity to be increased or decreased by the plurality of wrap layers.

The elliptical ovoid flywheel may also have dual boss plates attached to the innermost and outermost ovoid shell layers to provide the attachment of the ovoid shell to the shaft for co-rotation and torque transfer. By keeping the boss plate radius under 15% of the elliptical ovoid radius, the structural strength of the boss plates are never exceeded, eliminating the traditional flywheel structural weak point.

There are several energy storage advantages to the systems and methods described herein. Those include, but are not limited to, providing a flywheel that more efficiently uses its structural mass; providing means to increase the rotational speed of the flywheel without structural failure; providing a flexible flywheel structure that can adapt to its load profile; providing an economical flywheel structure that can be tailored to a customer's energy storage needs; and combining the advantages of a smaller, high energy density flywheel with smaller, compact subsystems to yield a low cost energy storage system. Still further advantages will become apparent from a study of the following description and accompanying drawings.

Before continuing, it is noted that as used herein, the terms "includes" and "including" mean, but is not limited to, "includes" or "including" and "includes at least" or "including at least." The term "based on" means "based on" and "based at least in part on."

Figure 1:
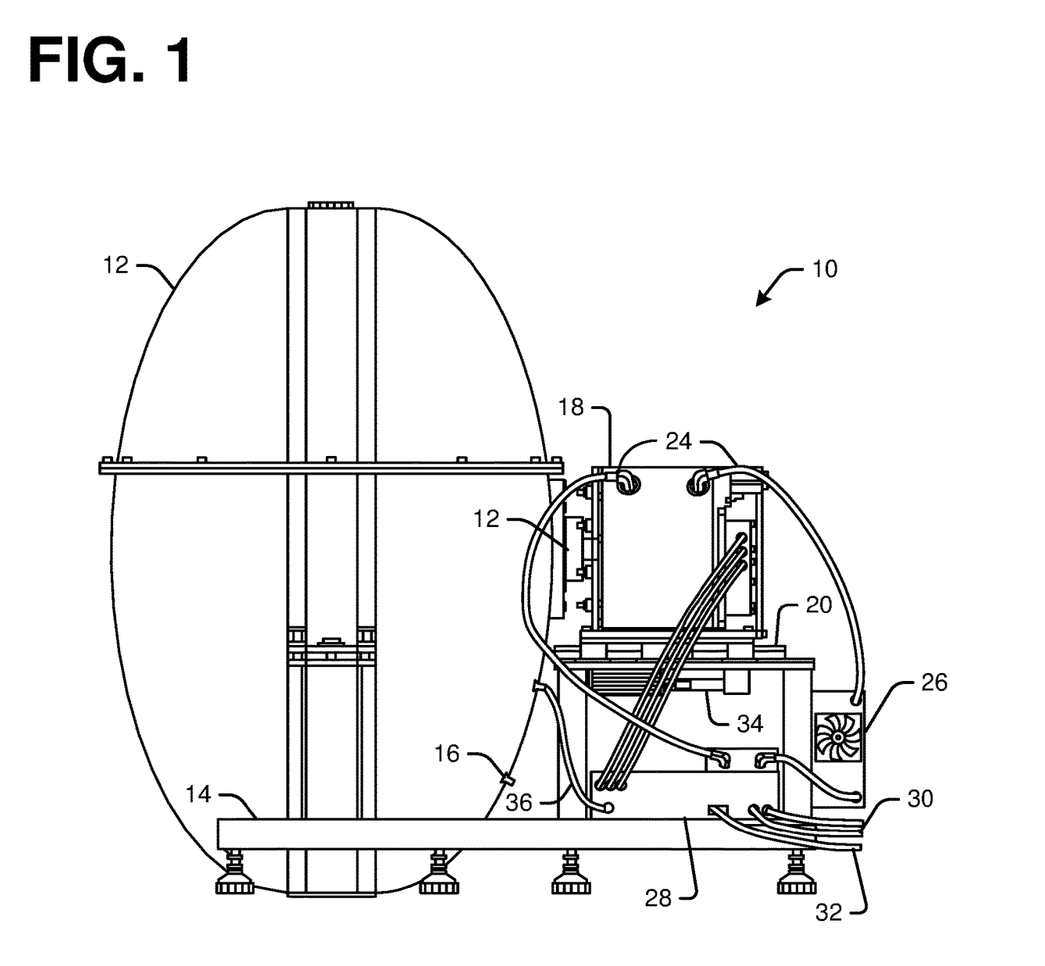
FIG. 1 is a perspective view of an example flywheel energy storage device.

FIG. 1 is a perspective view of an example flywheel energy storage device 10. An example of the system 10 includes a sealed flywheel assembly 12 on a mounting structure 14. A vacuum port 16 is provided through the sealed flywheel assembly 12. The flywheel assembly 12 may be operatively associated with a motor or generator 18 mounted to platform 20. For example, the flywheel assembly 12 may be operatively associated with the generator 18 via transmission link 22. In an example, the generator 18 may include cooling lines 24 operatively associated with a cooling subsystem 26.

In an example, the generator 18 may be operatively associated with a power control subsystem 28 having power connection(s) 30 and control and monitoring connection(s) 32. For example, the power control subsystem 28 may be operatively associated with the generator 18 via engagement controls 34.

Control of the subsystem(s) and/or transmission may be based at least in part on operating conditions in the flywheel assembly 12. For example, control may be based at least in part on one or more sensor(s) via connections 36.

Figure 2:
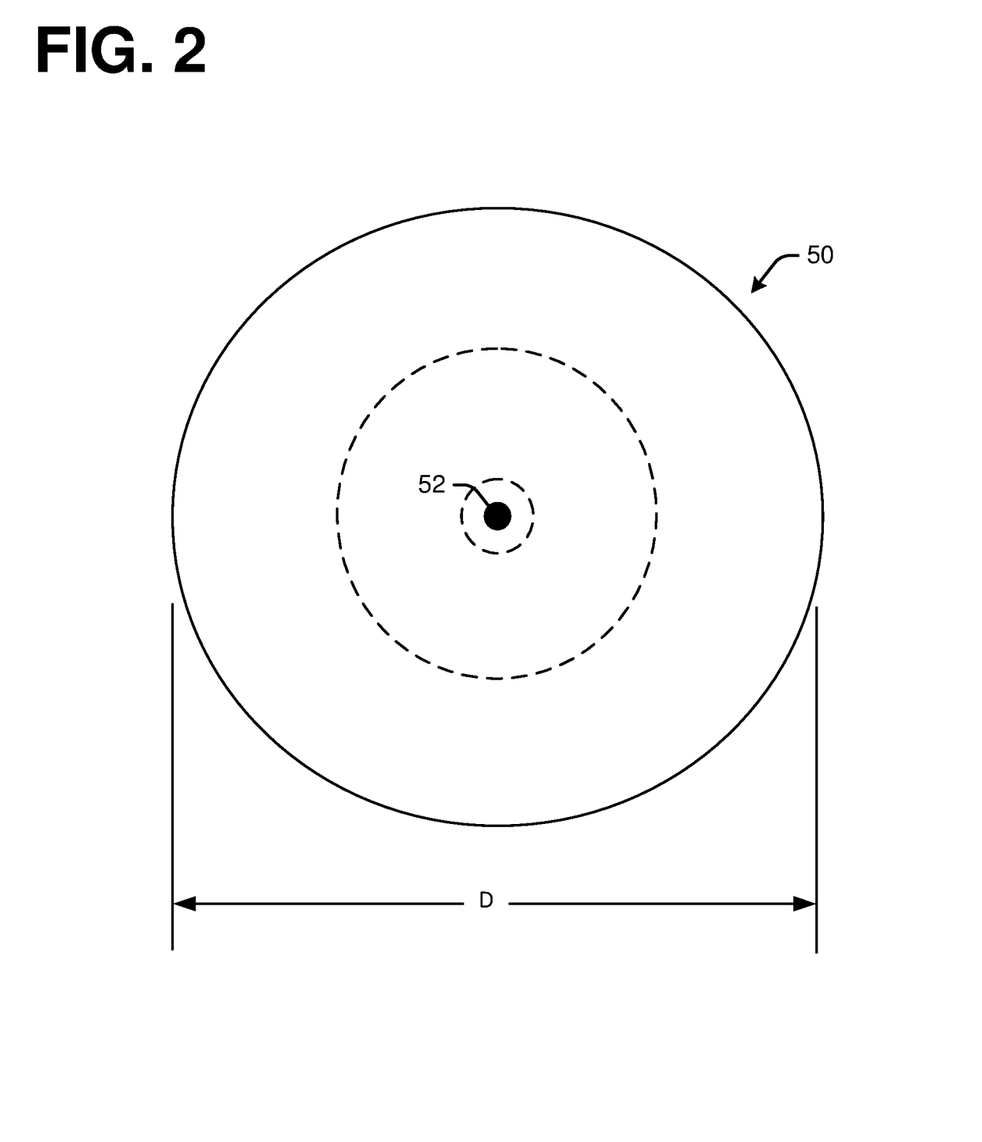
FIG. 2 is a side view of an example elliptical ovoid flywheel.

In an example, the flywheel assembly 12 houses a high speed, three-dimensional (3D) elliptical ovoid flywheel 50 mounted on a shaft 52 associated with transmission 22. FIG. 2 shows a side view of an example elliptical ovoid flywheel 50. The elliptical ovoid flywheel 50 offers a significant inertial mass and operating speed improvement over a two-dimensional disk, ring or cylinder shape, even one made of the same structural material and having the same or similar diameter. Table 1 provides a comparison of example flywheel capabilities for the same geometric and material constraints.

TABLE 1

Flywheel Capabilities

Design Factors
1-meter radius
50 kWh Operational Energy
1.5 Safety Factor

| | 2D Solid Steel Cylinder Flywheel | 2D Steel Hub, Composite Hollow Cylinder Flywheel | All Composite Structure 3D Elliptical Ovoid Flywheel |
|---|---|---|---|
| Materials Strength | ASTM A514 Steel 7800 mPa Yield | ASTM A514 Steel + Carbon fiber/laminate, 3000 mPa | Carbon fiber/laminate 3000 mPa |
| Rotor Mass (kg) | 5,500 | 1,630 | 250 |
| Inertial Mass (kg-m$^2$) | 689 | 175 | 24.1 |
| Operational Speed (RPM) | 7,000 | 14,000 | 36,000 |
| Rotor Length (m) | 0.9 | 1.06 | 0.45 |
| Energy Density (w-h/kg) | 4.5 | 15.1 | 205 |

TABLE 1-continued

Flywheel Capabilities

Design Factors
1-meter radius
50 kWh Operational Energy
1.5 Safety Factor

| | 2D Solid Steel Cylinder Flywheel | 2D Steel Hub, Composite Hollow Cylinder Flywheel | All Composite Structure 3D Elliptical Ovoid Flywheel |
|---|---|---|---|
| | | Materials Strength | |
| | ASTM A514 Steel 7800 mPa Yield | ASTM A514 Steel + Carbon fiber/laminate, 3000 mPa | Carbon fiber/laminate 3000 mPa |
| Energy Volume (w-h-liter) | 35.4 | 30.1 | 490 |

In an example, the elliptical ovoid flywheel 50 includes layers of helically wound resin-impregnated composite filament material forming the shape of an ovoid shell. This configuration provides the means to shift a significant inertial mass to the maximum flywheel diameter.

Adjusting the number of helically wound layers of the elliptical ovoid flywheel 50 allows tailoring of the flywheel inertial mass. Each layer of helically wound composite filament material is in nearly pure tension, maximizing the structural material performance, while the curvature of the ovoid composite shell minimizes stress concentrations detrimental to structural integrity. The 3D nature of the ovoid composite shell also allows the composite filament structural material at the flywheel maximum diameter to share stress in two planes, similar to membrane stress within a spherical pressure vessel, allowing the flywheel to exceed the classic hoop stress limits for a hoop wound disk, ring or cylinder by a significant portion.

During operation, the vacuum sealed flywheel 50 transfers torque and energy through the sealed vacuum enclosure 12 through a two part magnetic transmission attached to the flywheel shaft 52 and attached to the external motor/generator 18, geared to match the flywheel rotational speed with the operational speed of the external motor/generator 18.

Although not shown, an enclosure may also be provided to cover the motor/generator and connections (e.g., with the flywheel vacuum enclosure 12) and external magnetic transmission. In an example, one or more sensor(s) 36 provide position, temperature, vibration, flywheel revolutions per minute (rpm) and pressure readings which are relayed to the control display through wiring embedded in the vacuum enclosure 12.

The external motor/generator 18 is supported by a translating platform 14, control 28 to allow coupling and uncoupling of the external magnetic transmission from the vacuum enclosure. This allows the vacuum sealed elliptical ovoid flywheel 50 to disengage the external motor/generator 18, removing a prominent source of standby power loss. A small stand-by chemical battery, which is typically charged by the motor/generator 18 when in operation, or other external power maintains the required power to the sensor package and active axial thrust bearing when the motor/generator 18 is disengaged. With the disengaged motor/generator 18, the standby until 50% power remaining capability of the elliptical ovoid flywheel ESS can exceed 250 hours. Utilizing external plug-in power or a solar array to recharge the stand-by chemical battery, the standby until 50% power remaining capability of the elliptical ovoid Flywheel ESS can exceed 350 hours.

Figure 3:
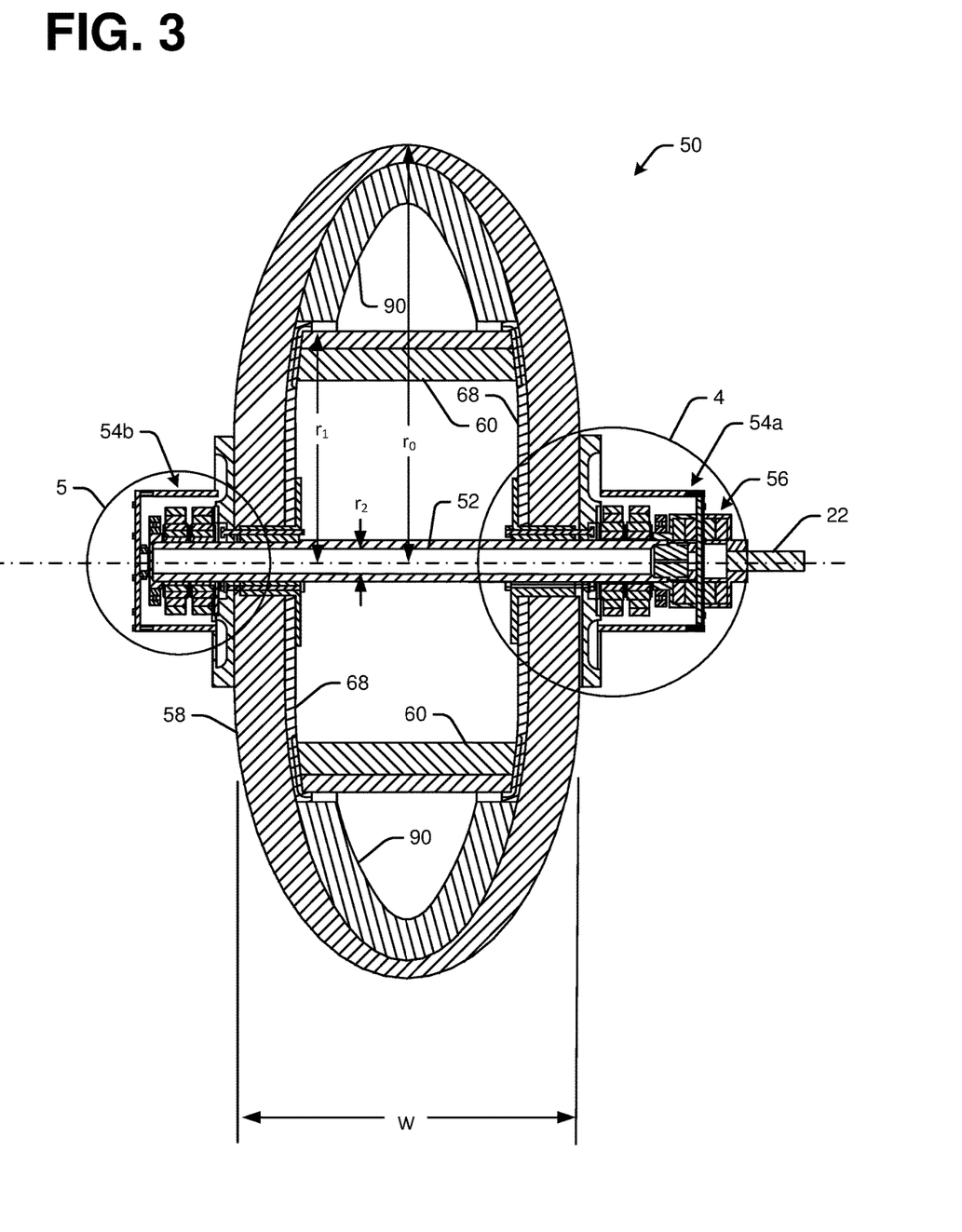
FIG. 3 is a cross-sectional view of the example elliptical ovoid flywheel, including bearing subsystems and transmission subsystem.
Figure 4:
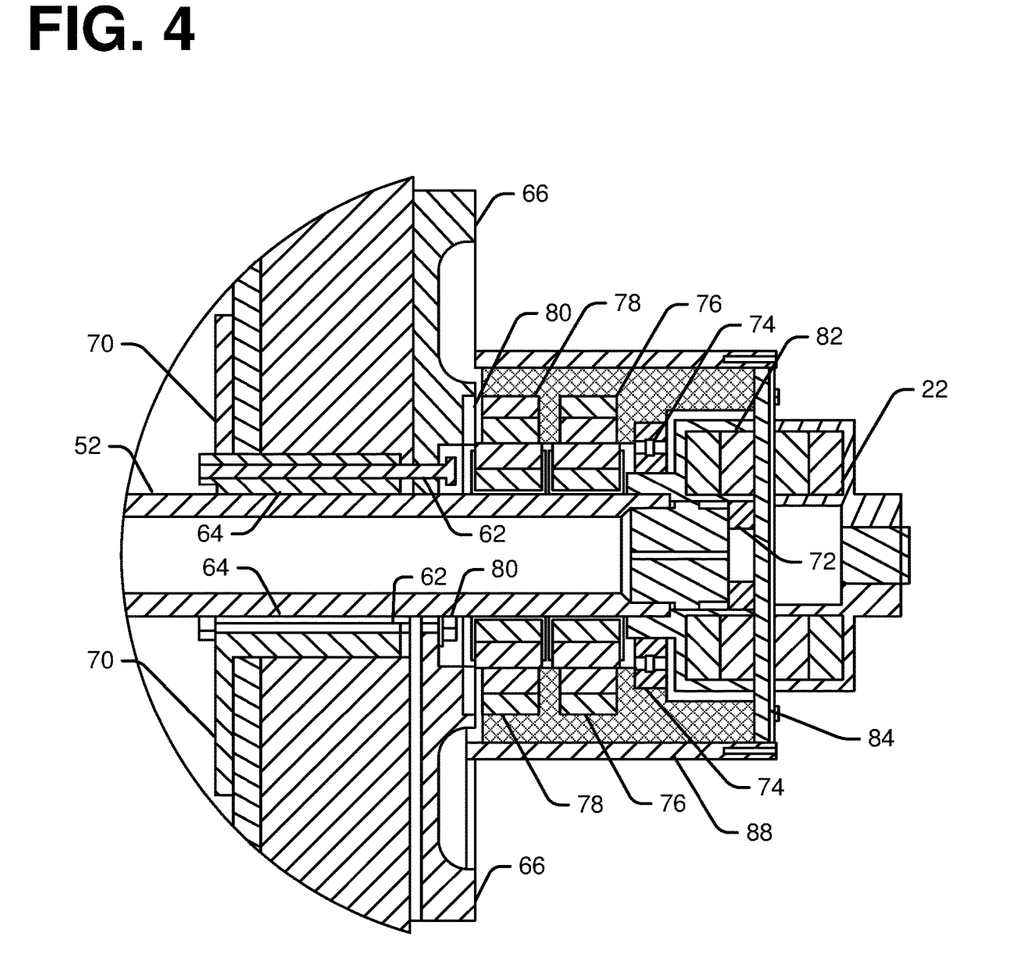
FIG. 4 is a detailed cross-sectional view of the right bearing subsystem and the transmission subsystem.
Figure 5:
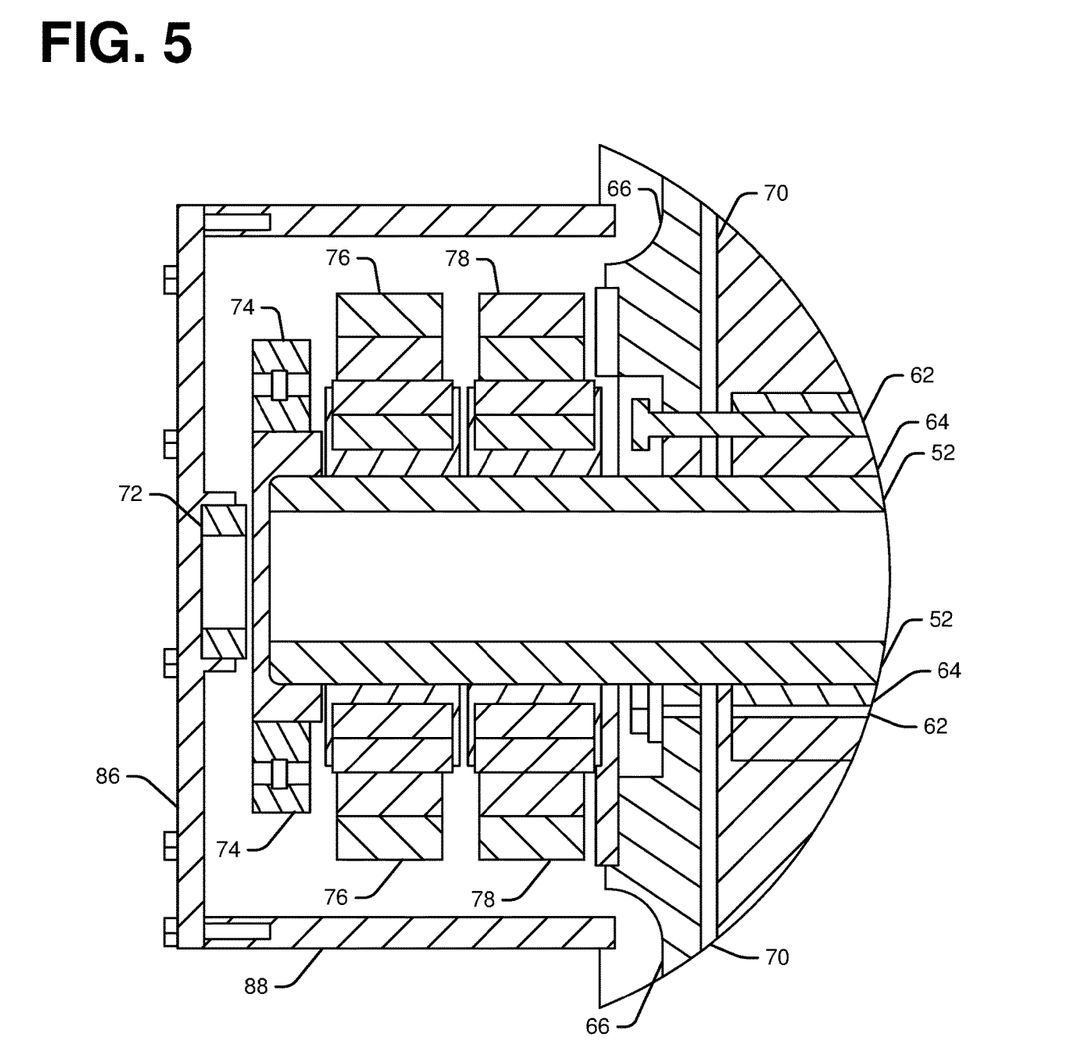
FIG. 5 is a detailed cross-sectional view of the left bearing subsystem.

FIG. 3 is a cross-sectional view of the example elliptical ovoid flywheel 50, including bearing subsystems 54a, 54b and transmission subsystem 56. FIG. 4 is a detailed cross-sectional view of the right bearing subsystem 54a (from detail area 4 in FIG. 3) and the transmission subsystem 56. FIG. 5 is a detailed cross-sectional view of the left bearing subsystem 54b (from detail area 5 in FIG. 3).

The example elliptical ovoid flywheel 50 may comprise an ovoid composite shell 58 with radial composite fiber overwrap on an integrated composite compressive support structure 60. The example elliptical ovoid flywheel 50 may be mounted on the shaft 52 via boss plate attachments 62 on internal boss plate supports 64 and outer balancing boss plates 66 and outer shell guide plates 68 and inner boss plate 70. The elliptical ovoid flywheel 50 is supported on each end of shaft 52 via an axial touchdown bearings and electro-magnet axial stabilizer 72 and radial touchdown bearings 74. Rotating PM bearings 76, stationary PM bearings 78, axial electrodynamic bearings 80 are also visible and carry the majority of the load and system stabilization. Internal PM transmission 82, moderator plate 84, back bearing housing plate 86, and bearing housing 88 are also visible.

The elliptical ovoid flywheel 50 may be constructed on an internal compressive support 90. In an example, an internal compressive support 90 is a circumferentially wound hollow cylinder of resin-impregnated composite filament material of radius r1 and a thickness that provides compressive support when the flywheel is in operation. The internal compressive support is bonded in place to the inner elliptical ovoid wrap of the outer ovoid shell.

In an example, the composite fiber material for the elliptical ovoid flywheel structure is selected to have minimal elongation while under stress (e.g., like carbon/graphite fibers) as to not compromise the structural integrity of the flywheel against the vacuum enclosure. Certain composite materials (e.g., like reinforced plastics, fiberglass, ultra-high density polyethylene, basalt and aramid fibers) that continuously elongate or "creep" under load, may be unsuitable for this flywheel application due to its high continuous load requirements while in active operation.

In an example, the outer shell of the elliptical ovoid flywheel 50 is comprised of a plurality of helically wrapped resin-impregnated composite filament laminate layers comprising thickness t0 with each layer completely covering the circumference of the flywheel radius r0. The inner laminate layer follows an inner elliptical ovoid form that is removed after wrap completion, creating an internal void. The inner laminate layer follows a low angle helical winding path, bypassing the flywheel shaft and shaft support, and is bonded to the outer face of the inner boss flange plates. Each additional laminate layer increasingly increments its helical winding path angle to a maximum angle equal to the inner support cylinder outer radius r1.

After the desired number of laminate layers has been added to provide the stress support and inertial mass, the outer laminate layer finishes with the optimum helical angled elliptical path. In each of the laminate layers between, the elliptical path transitions to a vertical path through an elliptical section across the thickness of the internal hollow cylinder support to allow the compressive stresses to be concentrated at the region of greatest internal structural support.

The elliptical ovoid flywheel 50 is supported and stabilized along its spin axis and shaft 52 by an active electro-magnet thrust bearing, shaft attached radial magnetic bearings and enclosure fixed radial magnetic bearings, axial electrodynamic bearings, and back-up touchdown bearings. A portion of the outer boss flange plate on either side of the flywheel provides balancing mass for fine tuning the inertial axis along the axis of rotation.

Elliptical ovoid flywheel construction is visible in FIG. 3, showing the internal compressive support of radius r1 and thickness t1, external boss flange plates, internal boss flange plates, shaft support and internal shaft supports. Also included in this view is a helical wrapping guide plate bonded to the ends of the internal compressive support.

FIG. 3 also illustrates the full elliptical shape of radius r0 outer helical wrap layer set with a sole compressive support of width W that doubles as the shaft compressive support. FIG. 3 also illustrates a partial elliptical shape of radius r0 outer helical wrap layer set with multiple internal compressive supports of width W. The side view illustrates locations of the internal compressive supports for example systems relative to the flywheel diameter.

An example elliptical ovoid flywheel outer shell, showing a stepped composite filament-resin wrapping with the starting low angles out to the optimal helical angled elliptical path that intersects the outer radius of the hollow inner compressive support cylinder. The plurality of helically wrapped resin-impregnated composite filament laminate wraps comprises each layer of the ovoid composite shell.

Finite Element Analysis results of the example elliptical ovoid flywheel 50 with example inner and outer elliptical helical wrap laminate layers with the internal hollow cylinder compressive support. The predicted Safety Factor (SF) is included to allow interpretation of the flywheel stress analysis at the 36,000 rpm operating speed.

Before continuing, it should be noted that the examples described above are provided for purposes of illustration, and are not intended to be limiting. Other devices and/or device configurations may be utilized to carry out the operations described herein.

In an example, the components and connections depicted in the figures may be implemented for the following operations. The operations shown and described herein are provided to illustrate example implementations. It is noted that the operations are not limited to the ordering shown. Still other operations may also be implemented.

In an example operation, the elliptical ovoid flywheel 50 is rotated around a horizontal or vertical axis on shaft 52 within a vacuum enclosure 12 supported by magnetic bearings (FIGS. 3-5). Magnetic bearings provide support in the radial and axial directions. The speed of the elliptical ovoid flywheel 50 can be increased or decreased, and hence its energy storage level can be increased or decreased, by transferring torque through the vacuum enclosure 12 (e.g., by means of a magnetic transmission attached to the flywheel shaft 52 and external motor/generator 18). The magnetic transmission acts as an intermediary between the elliptical ovoid flywheel 50 and the external motor/generator 18, allowing the rotational energy to transfer via magnetic coupling through the wall of the vacuum enclosure 12. Power input and output is provided by the external motor/generator 18, which pulls power from a user source to speed up the elliptical ovoid flywheel 50 to convert electrical power into rotational kinetic energy, and then pushes power to a user as it slows down the elliptical ovoid flywheel 50, converting the rotational kinetic energy back into electrical power.

When the elliptical ovoid flywheel is in operation, various design aspects increase the available energy storage. In an example, the inner and outer elliptical arches of the ovoid shell slightly extend (e.g., about 1-2% compared to a stationary state) due to centripetal forces pulling the structure radially. This slightly extends the flywheel outer radius, increasing the inertial moment while the flywheel is in operation, allowing 3-5% additional energy storage capability. This flexibility allows the 3D structural design to adapt to its load profile while contributing a positive gain to the flywheel energy storage capability.

In an example, the elliptical ovoid flywheel 50 may also utilize carbon/graphite fiber composite filaments that have an approximate 1-2% total elongation under load. With these filaments helically wrapped in a radial orientation, the expected elongation slightly extends the flywheel outer radius while under load. This increases the flywheel inertial moment while the flywheel is in operation, allowing about 3-5% additional energy storage capability. This flexibility allows the 3D structural design to adapt to its load profile while contributing a positive gain to the flywheel energy storage capability.

In an example, the inner structural composite cylinder also allows flexing both radially (from the ovoid shell compressive stress) and from the radial dilation of the hoop oriented composite filaments. The resulting slight increase in the composite cylinder radius flexes into the upper void space, and does not impart added stress to the outer ovoid shell as would a traditional ring-rim overwrap.

In an example, by shifting the helical wrap angle upward for each subsequent wrap layer of the ovoid shell, the filaments (that would otherwise concentrate around the shaft) are shifted to greater radii, increasing the effective flywheel moment of inertia, while still spreading the tensile stress of the filament layers through the increased shell cross sectional thickness radiating outward from the shaft.

In an example, the overlapping layers of the helical overwrap placed in the elliptical arch create the 3D nature of the ovoid composite shell. This allows the structural composite material in the flywheel ovoid shell to share stress in two planes, similar to membrane stress within a spherical pressure vessel. This allows the elliptical ovoid flywheel to exceed the classic hoop stress limits for a hoop wound disk, ring or cylinder of the same radius by over about 40%, allowing a significant increase in the elliptical ovoid flywheels operational rotational speed and thereby an increase in its energy storage level. As the elliptical ovoid flywheel width-to-diameter ratio approaches 1.0, and the flywheel takes on a spherical shape (instead of an ovoid), the two plane stress improvement approaches 100% over the classical hoop stress. The added compressive stress from increasing the width-to-diameter ratio must be handled by adding internal flywheel structure.

When these five aspects are combined into the elliptical ovoid flywheel structure, the energy storage capability increases up to five times higher when compared with a traditional flywheel of the same structural material, mass and diameter.

EXAMPLE

An example elliptical ovoid flywheel as shown in FIG. 1 was designed and evaluated by Finite Element Analysis (FEA). The example flywheel was designed with the ovoid shell and internal support wound with medium strength 3000 mPa carbon composite fiber laminate with an epoxy resin impregnate. The boss flanges were simulated utilizing stainless steel AISI A514. The simulated flywheel was modeled in an enclosed vacuum environment with near frictionless operation with magnetic bearings, as illustrated in FIG. 3. The maximum diameter of the simulated flywheel was about 1.0 meters with a width of about 0.45 meters on the attached shaft.

After analysis, the stored energy in the simulated flywheel was determined to be about 50.9 kilowatt-hours, with a flywheel inertia of about 24.1 kilogram-meters squared, and an operational speed of about 36,000 revolutions per minute.

System stresses maintained a safety factor of about 1.4 to 2.2. Not only was the simulated flywheel operation well within an expected safety factor for commercial applications, but it also achieved a gravimetric energy density of about 205 watt-hours per kilogram based on the total mass of the flywheel, and about 490 watt-hours per liter volumetric energy density based on the volume of the flywheel. This is compared to approximately 20 watt-hours per kilogram and 45 watt-hours per liter for traditional 2D cylindrical flywheels. Fatigue analysis indicates the elliptical ovoid flywheel will provide over 200,000 charge/discharge cycles during its lifecycle.

Utilizing higher strength carbon composite fiber laminate with a strength of 4100 mPa, in the same simulated flywheel geometry, the operational speed exceeded 49,000 rpm for the same safety factor, and achieved an energy storage capacity of about 97 kilowatt-hours.

Figure 6:
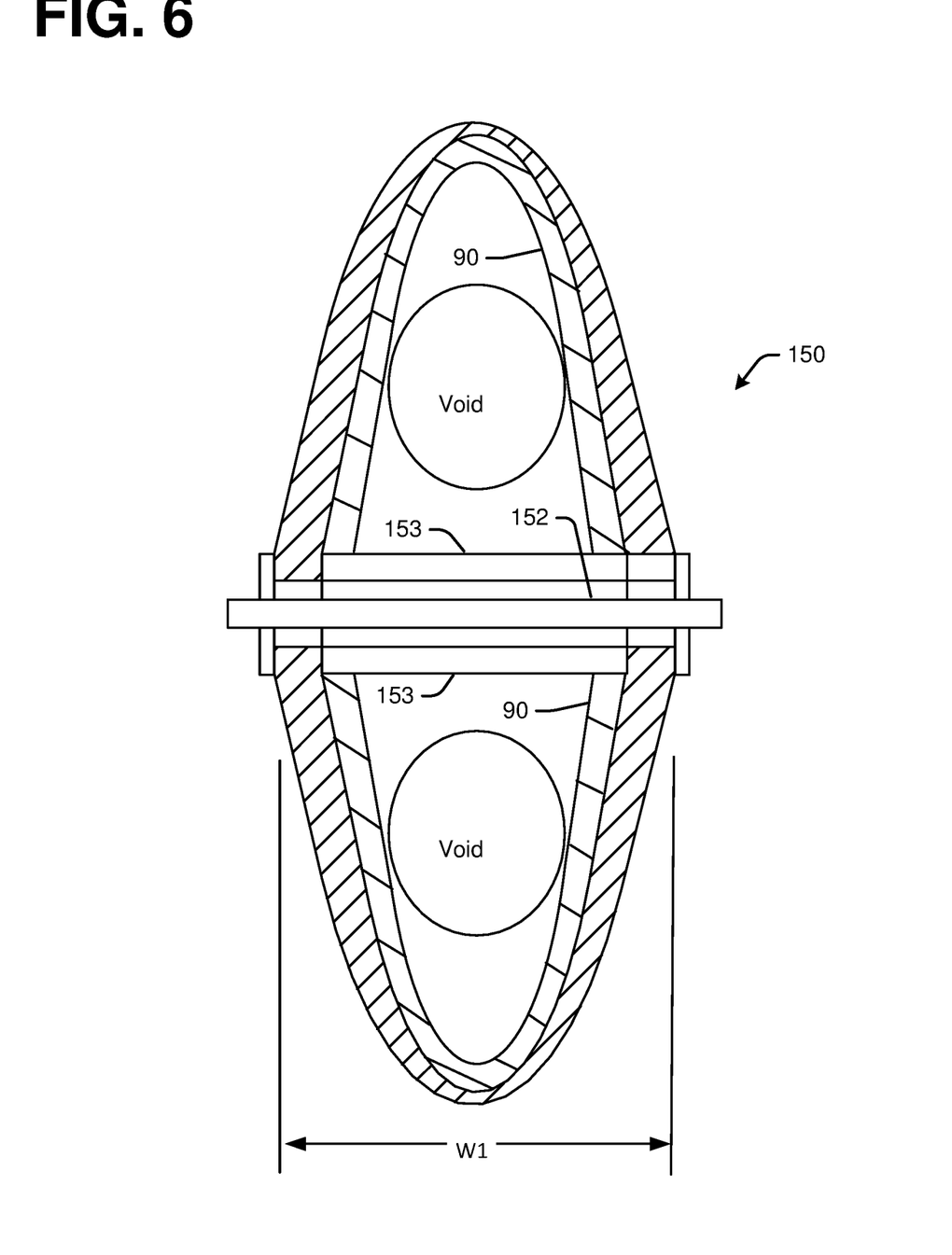
FIGS. 6-7 are cross-sectional views of other example elliptical ovoid flywheels.
Figure 7:
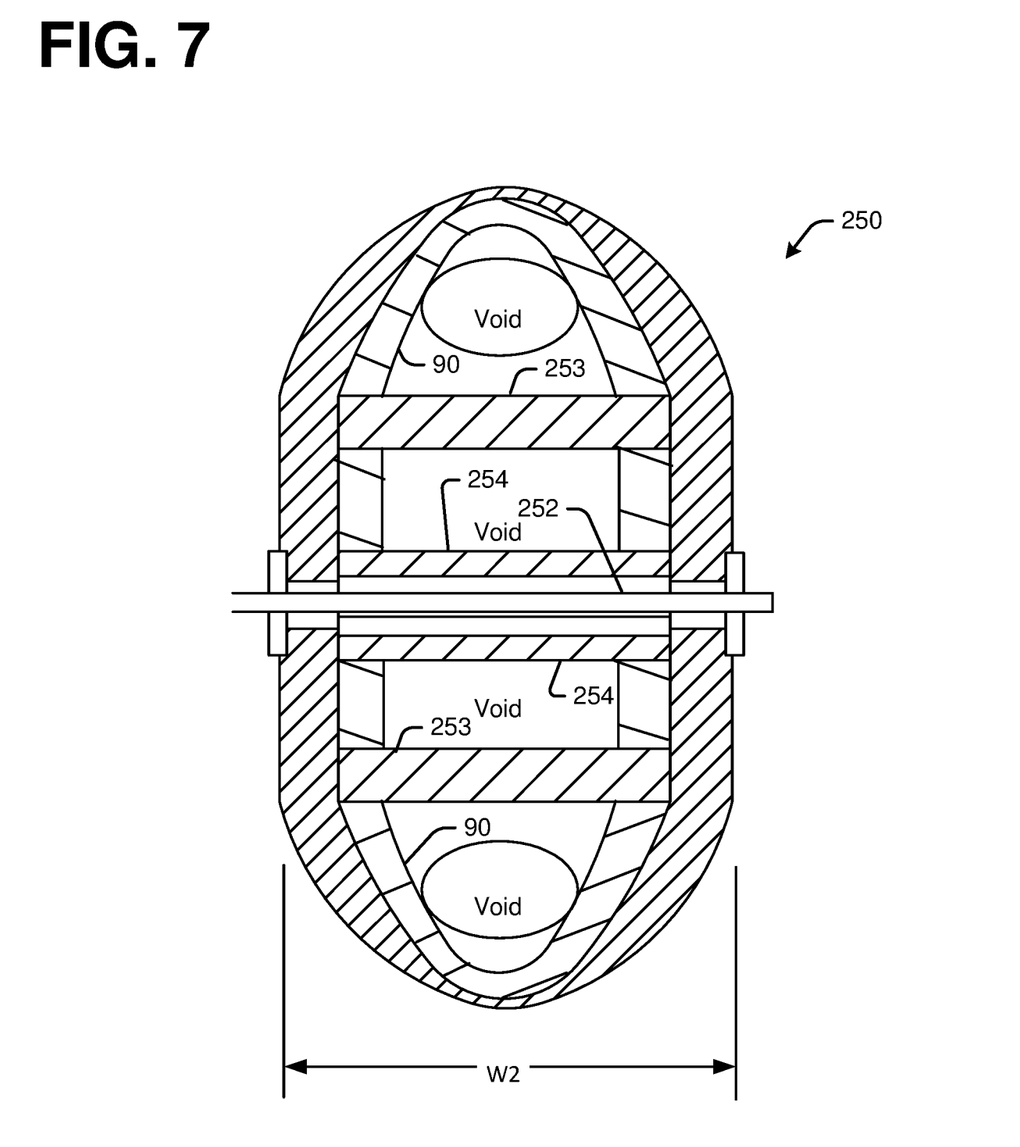

FIGS. 6-7 are cross-sectional views of other example elliptical ovoid flywheels. The elliptical ovoid flywheel 150 in FIG. 6 is more conical than the elliptical ovoid flywheel 50. The elliptical ovoid flywheel 150 is the same width (width W1 is about the same as width W of flywheel 50), and has an internal support structure 153 near shaft 152. The elliptical ovoid flywheel 250 in FIG. 7 is wider (width W2) with a center internal support structure 253 and another support structure 254 near shaft 252.

The systems and methods disclosed herein provide an elliptical ovoid flywheel capable of greater stored energy per unit mass than previously known rotational energy storage devices. It will be appreciated that the elliptical ovoid flywheel described herein is particularly adaptable to supplying energy storage with a small operational footprint and mass so as to be utilized at deployed utility and renewable energy locations, residential and commercial locations, and potentially in transportation, e.g., powering electric vehicle charging stations.

It is noted that the examples shown and described are provided for purposes of illustration and are not intended to be limiting. Still other examples are also contemplated, including but not limited to a vertically oriented elliptical ovoid flywheel.

The invention claimed is:

1. A flywheel energy storage device, comprising:
   a fiber-resin composite elliptical ovoid shell having an axial shaft and axial walls;
   a hub boss plate on each side of the ovoid shell, the hub boss plates concentrically disposed within and outside the shell and attached to the axial shaft; and
   a plurality of radially oriented, fiber-resin composite helical wraps coupling the shell to the hub boss plates for co-rotation and torque transfer to the axial shaft; and
   an axially oriented internal compressive support between the axial walls of the elliptical ovoid shell;
   wherein upon rotation, the elliptical ovoid shell elongates slightly to increase a moment of inertia about the elliptical ovoid shell; and
   wherein each layer of the radially oriented helical wrap is angled initially about 5 degrees and stepped to about 35 degrees to shift wrap layer mass build-up away from the axis of rotation to increase flywheel moment of inertia.

2. The flywheel energy storage device of claim 1, further comprising a plurality of sets of helical wraps, each set of helical wraps having a uniform width.

3. The flywheel energy storage device of claim 2, wherein each set of helical wraps has a layer extending around the outer surface of the shell and the hub on both sides of the axis of rotation.

4. The flywheel energy storage device of claim 2, wherein each set of helical wraps has a near continuous, single ended filamentary material wound in a unidirectional relationship and encased in a resin matrix.

5. The flywheel energy storage device of claim 2, wherein each set of helical wraps is uniformly stressed over the width of each wrap during rotation.

6. The flywheel energy storage device of claim 2, wherein each set of helical wraps has a radially oriented, layered composite shell.

7. The flywheel energy storage device of claim 2, wherein the helical wraps are disposed in an overlapping relationship with one another on portions of the hub at locations adjacent to the axis of rotation.

8. The flywheel energy storage device of claim 1, wherein the radially oriented helical wrap is configured to transfer tensile tip stress to thea thickened structure near the axis of rotation under compressive stress, thereby maximizing the effective strength of the filament wound composite laminate.

9. The flywheel energy storage device of claim 1, further comprising integrated internal structures attached to and providing compression support for the elliptical ovoid shell.

10. The flywheel energy storage device of claim 9, wherein the internal structures are formed from metal or a near continuous single ended filamentary material wound in a unidirectional relationship in a plurality of layers and encased in resin matrix.

11. The flywheel energy storage device of claim 10, wherein the internal structures have a minimum inner-to-outer ratio of about 0.1 when compared with the outer diameter of the ovoid shell.

12. The flywheel energy storage device of claim 1, wherein the internal structures are formed from metal, composite laminate wound in a unidirectional relationship in a plurality of layers and that are bonded to the inner layer of the elliptical ovoid shell.

13. The flywheel energy storage device of claim 12, wherein the internal structures have a minimum inner-to-outer ratio of about 0.1 when compared with the outer diameter of the ovoid shell.

14. The flywheel energy storage device of claim 1, wherein the width-to-diameter ratio available of the elliptical ovoid shell is about 0.1 to 1.0.

15. The flywheel energy storage device of claim 1, wherein the inner and outermost peripheral surface of the ovoid shell is in the configuration of a rotational ellipse.

16. The flywheel energy storage device of claim 1, wherein the ovoid shell helical wrap layers are secondarily used to control the inertial mass of the flywheel.

17. The flywheel energy storage device of claim 16, wherein adding or subtracting layers configures the flywheel energy storage capacity to be increased or decreased by the plurality of wrap layers.

18. The flywheel energy storage device of claim 1, further comprising dual boss plates attached to both sides of the innermost and outermost ovoid shell layers to provide the attachment of the ovoid shell to the shaft for co-rotation and torque transfer.

* * * * *